United States Patent
Newson et al.

(10) Patent No.: US 10,631,528 B2
(45) Date of Patent: Apr. 28, 2020

(54) FISHING LURE

(71) Applicants: Andre Bernard Newson, Valdosta, GA (US); Tracy Eugene Crawford, Valdosta, GA (US)

(72) Inventors: Andre Bernard Newson, Valdosta, GA (US); Tracy Eugene Crawford, Valdosta, GA (US)

(73) Assignee: Limit Systems LLC, Valdosta, GA (US)

( * ) Notice: Subject to any disclaimer, the term of this patent is extended or adjusted under 35 U.S.C. 154(b) by 103 days.

(21) Appl. No.: 15/396,703

(22) Filed: Jan. 2, 2017

(65) Prior Publication Data

US 2017/0196210 A1   Jul. 13, 2017

Related U.S. Application Data

(60) Provisional application No. 62/277,410, filed on Jan. 11, 2016.

(51) Int. Cl.
| | | |
|---|---|---|
| *A01K 85/02* | (2006.01) | |
| *A01K 83/00* | (2006.01) | |
| *A01K 85/12* | (2006.01) | |
| *A01K 91/04* | (2006.01) | |

(52) U.S. Cl.
CPC .............. *A01K 85/02* (2013.01); *A01K 83/00* (2013.01); *A01K 85/12* (2013.01); *A01K 91/04* (2013.01)

(58) Field of Classification Search
CPC ........ A01K 85/00; A01K 85/02; A01K 85/16; A01K 85/18
See application file for complete search history.

(56) References Cited

U.S. PATENT DOCUMENTS

| | | | | |
|---|---|---|---|---|
| 784,942 | A * | 3/1905 | Henckler ............... | A01K 83/00 43/43.4 |
| 2,233,863 | A * | 3/1941 | Driscoll ................. | A01K 83/00 43/43.16 |
| 2,379,886 | A * | 7/1945 | De Witt .................. | B21F 45/12 140/104 |
| 2,825,173 | A * | 3/1958 | Gederos ................. | A01K 83/06 43/44.2 |
| 3,023,536 | A * | 3/1962 | Williams ............... | A01K 83/00 43/42.25 |
| 3,758,976 | A * | 9/1973 | Szwolkon .............. | A01K 83/00 43/42.24 |
| 4,060,928 | A * | 12/1977 | Messler ................. | A01K 83/00 43/42.24 |
| 4,214,398 | A * | 7/1980 | Campbell .............. | A01K 83/00 43/43.16 |
| 4,835,898 | A * | 6/1989 | Pond ...................... | A01K 83/00 43/43.1 |
| 4,905,402 | A * | 3/1990 | Clark ..................... | A01K 83/00 43/43.16 |
| 5,065,541 | A * | 11/1991 | Coody ................... | A01K 85/00 43/42.24 |
| 5,115,594 | A * | 5/1992 | Gowing ................. | A01K 83/00 43/44.82 |
| 5,237,772 | A * | 8/1993 | Gibbs .................... | A01K 83/00 43/43.16 |

(Continued)

*Primary Examiner* — Christopher R Harmon

(74) *Attorney, Agent, or Firm* — Smith & Hopen, P.A.; Steven M. Forte; Nicholas Pfeifer

(57) ABSTRACT

A fishing lure that simulates the appearance of an elongated aquatic animal swimming through water.

17 Claims, 12 Drawing Sheets

(56) References Cited

U.S. PATENT DOCUMENTS

| | | | | |
|---|---|---|---|---|
| D392,715 S | * | 3/1998 | Reed | D22/144 |
| D392,716 S | * | 3/1998 | Michael | D22/144 |
| 6,519,895 B1 | * | 2/2003 | Bennett | A01K 83/00 43/42.39 |
| D507,034 S | * | 7/2005 | Robertson | D22/144 |
| 7,036,266 B2 | * | 5/2006 | Falcon | A01K 83/00 43/44.81 |
| 7,234,267 B1 | * | 6/2007 | Konstant | A01K 85/01 43/42.24 |
| D586,424 S | * | 2/2009 | Gibbs | D22/144 |
| 9,185,891 B2 | * | 11/2015 | Nakamichi | A01K 83/00 |
| 9,474,257 B1 | * | 10/2016 | McGilvry | A01K 85/02 |
| 2002/0188057 A1 | * | 12/2002 | Chen | A01K 85/00 524/575 |
| 2010/0050497 A1 | * | 3/2010 | Brown | A01K 85/00 43/42.24 |
| 2016/0270379 A1 | * | 9/2016 | Perez | A01K 85/00 |

* cited by examiner

FISHING LURE

CROSS-REFERENCE TO RELATED APPLICATIONS

This nonprovisional application is a continuation of and claims priority to provisional application No. 62/277,410, entitled "Fishing Lure," filed Jan. 11, 2016 by the same inventors.

BACKGROUND OF THE INVENTION

1. Field of the Invention

The present invention is in the technical field of fishing. More particularly, the present invention is in the technical field of a fishing lure configured for fastening to a fishing line. More particularly, the present invention is in the technical field of a fishing lure that rotates.

2. Brief Description of the Prior Art

The difficulty in simulating the appearance of natural swimming as seen in certain elongated swimming aquatic animals, such as certain sea or freshwater snakes, eels, lizards or elongated fish, is well known in the field of fishing lure development.

One of the characteristics of natural swimming in certain elongated swimming aquatic animals is that, while swimming, portions of the animal's body rhythmically transversely cross the primary longitudinal axis of the general direction in which the animal is swimming. This rhythmic transverse crossing results in portions of the animal's body but not all of the animal's body moving from side-to-side. Furthermore, the side-to-side motion of portions of the animal's body may be described as undulation and may be observed to be of large magnitude. The magnitude of this body undulation observed in nature in certain elongated swimming aquatic animals is often related more to the length of the animal's body than to any other dimension. When the magnitude of said body undulation is measured as the total positional width of the animal's body at any point in time during swimming it may be observed that the magnitude of undulation may be in the range of around 10% to over 100% of the animal's positional body length while swimming as measured from head to tail along the primary axis of the direction of swimming. When the magnitude of said body undulation is measured as the distance a given point on the animal's body moves transversely away from the primary longitudinal axis of the general direction in which the animal is swimming, the magnitude of undulation may be in the range of 5% to over 50% of the animal's positional body length as measured from head to tail along the primary axis of the direction of swimming. In addition to the said body undulation, the head is also naturally wobbles from side-to-side, and the tail flexes back and forth. Head wobbling, large magnitude body undulation and tail flexure of elongated swimming aquatic animals while swimming do not occur independent of one another. Rather, they occur in relation to one another in a manner controlled by the physiology of the animal.

Several approaches have been tried to simulate the natural swimming appearance described above. One approach includes an elongated, snakelike body formed of resilient material that has a series of U-shaped sections. This configuration, when not moving has the unnatural appearance of a snake at rest with a body fixed in a strongly curved position as if swimming. When moving, the lure has the unnatural appearance of a snake in the shape of a swimming snake, without undulation, and is simply dragged through the water in a relatively fixed shape.

By adjusting the resilience of the material of a snakelike body having a series of U-shaped sections a certain degree of elongating and contracting has been achieved. Unfortunately, the natural signature of an elongated aquatic animal when it is swimming is not primarily elongation and contraction but rather the body undulation where certain points on the animal's body move with a large magnitude from one side of the primary swimming direction axis, to the other side, as previously described.

Another approach has been to form a helical spiral body. Such a body shape, however, is rarely observed, either statically or dynamically, in elongated swimming aquatic animals.

Segmented lures composed of several movably connected sections have been tried, but suffer from not being nor appearing smoothly continuous in form as is observed in nature.

Another approach has been to form an elongated body of resilient material that is formed in the shape of a ribbon for either the entire length of the lure or for a portion of the length of the lure, such as the tail portion. Resilient ribbon structures for use as fishing lures are typically formed in either a flat or as a spiral shape. Additionally, a modified type of ribbon structure that has a T-shaped cross section has been observed. Resilient ribbon structures when pulled through water do exhibit a type of undulation, but the undulation observed is unfortunately of small magnitude and may more resemble rapid fluttering. Such motion may serve as a useful attractant, but may not well-simulate the desired specific natural swimming characterized by larger magnitude body undulation.

Another approach observed is a variation in which a body portion is formed separately from a head and said body portion angularly oscillates about a pivot point between the head and body portions when the lure is moved through water. This approach creates a certain degree of wobbling side to side or up and down, but fails to create large magnitude body undulation.

A variety of jig head lures, with and without lips, integrated with a pliable body are known, but unfortunately do not achieve the large magnitude body undulation required to strongly simulate the desired swimming aquatic animals.

Another approach observed entails a simple Aberdeen style hook having no head and intended for use primarily with live bait, such as worms. The design includes a bend in the hook shank area to displace bait volume primarily in the hook shank area to create rotation when pulled through the water. This approach causes the hook and bait to rotate when pulled through water, but does not create the appearance of large magnitude undulation and does not create any head wobbling.

Accordingly, what is needed is a fishing lure design configured to better represent a natural swimming motion of an elongated aquatic animal. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a fishing lure providing a more natural and realistic swimming motion for elongated aquatic animals is now met by a new, useful, and nonobvious invention.

The present invention is a fishing lure that has a realistic appearance of an elongated swimming aquatic animal, such as a sea or freshwater snake, eel, lizard, or elongated fish including fish species known as or similar in appearance to snakehead.

The unique shape of the present invention places volume in at least two distinct planes including within a gape area. When attached to a fishing line and pulled through water the unique shape of the lure creates a set of forces that causes a unique set of motions similar to elongated swimming aquatic animals. A distinct head and body may be included to further simulate the desired aquatic animals. Specifically, the unique shape of the present invention creates, when pulled through water, motions that include body rotation, head wobbling and tail flexure.

An embodiment may include a swivel mechanism disposed between the lure and the fishing line. Inclusion of a swivel mechanism allows the lure to rotate without twisting the fishing line.

An embodiment may include a pivoting mechanism disposed between the lure and the fishing line. Inclusion of a mechanism to allow side-to-side motion increases wobbling to enhance the appearance of a swimming animal.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
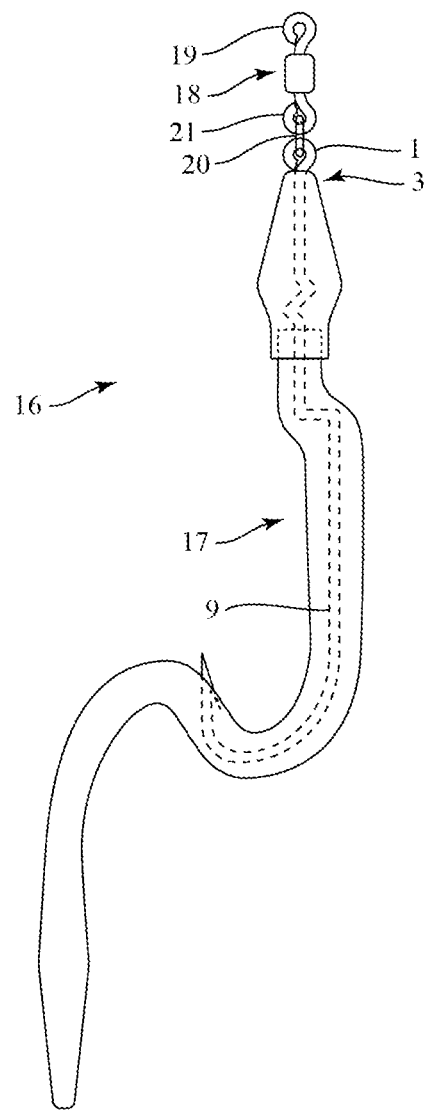
FIG. 1 is a top view of a fishing lure assembly of the present invention.
Figure 2:
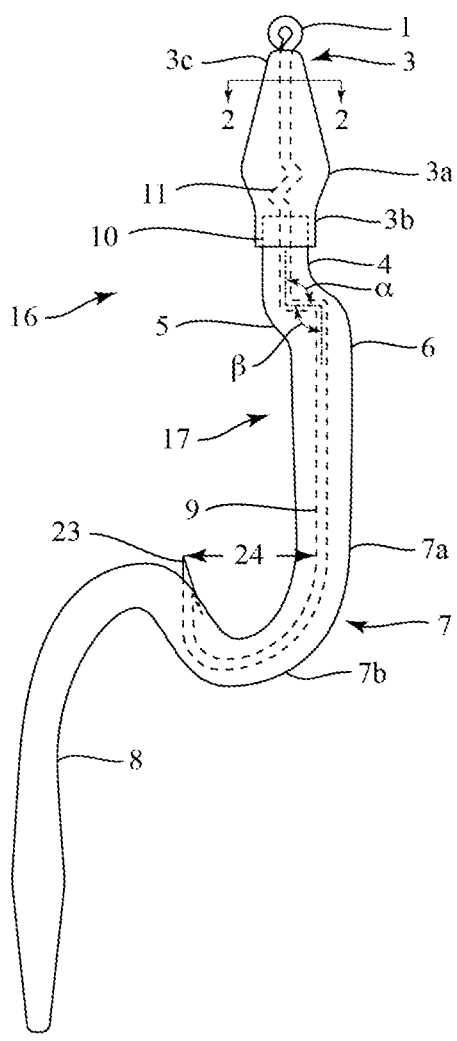
FIG. 2 is a top view of the fishing lure assembly of FIG. 1.
Figure 3:
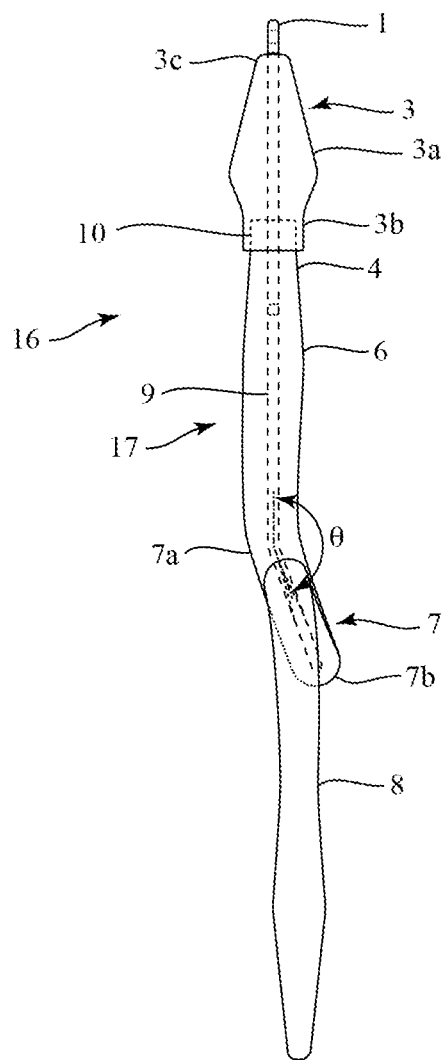
FIG. 3 is a side view of the fishing lure assembly of FIG. 1.

Referring now to FIGS. 1-3, an embodiment of the present invention is a fishing lure assembly 16. Fishing lure assembly 16 preferably includes head 3, body 17, and hook member 9. In an embodiment, fishing lure assembly 16 may include an attachment mechanism 1 for attachment to a fishing line. In addition, fishing lure assembly 16 may include various mechanisms disposed between the fishing line and fishing lure assembly 16, such as swivel mechanism 18 and split ring 20. Swivel mechanism 18 includes first swivel attachment 19 for attachment to the fishing line and second swivel attachment 21 for attachment to fishing lure assembly 16.

Referring to FIGS. 2 and 3, an embodiment of head 3 includes anterior portion 3c, cranial portion 3a and cervical portion 3b. Anterior portion 3c, cranial portion 3a and cervical portion 3b may have variable dimensions so as to better simulate different swimming animals. Head 3 may be formed of rigid or resilient material or of hard or soft material.

Body 17 of fishing lure assembly 16 may be a separate part from head 3 or integral to head 3 and may be formed of rigid or resilient or of hard or soft material. In the case that body 17 is formed as a separate part from head 3, head 3 may be provided with recessed portion 10 to accept body 17 in a more seamless, natural manner.

Body 17 of the embodiment provided in FIGS. 2 and 3 can be viewed as several sections or portions that include:
1. first body portion 4, extending from cervical portion 3$b$ of head 3 and disposed substantially along an extension of the primary longitudinal axis of head 3;
2. second body portion 5 disposed at a first exterior angle $\alpha$ to first body portion 4, and;
3. third body portion 6 disposed at a second interior angle $\beta$ to second body portion 5 such that head 3, first body portion 4, second body portion 5 and third body portion 6 lie substantially within one plane;
4. fourth body portion 7 that contains curved portion 7$b$ curving in the direction toward head 3 and that is disposed substantially into a second plane forming an obtuse planar angle $\theta$ to the first plane;
5. tail portion 8; and
6. at least one hook member 9 passing through a majority of body 17.

The fourth body portion 7 may contain a straight portion 7$a$.

The embodiment described serves to place volume into two distinct planes and more particularly to place some of the second volume from fourth body portion 7 into the second plane and into a curved shape. The placement of volume into at least two distinct planes creates asymmetrical rotational forces when the lure is pulled through water causing the lure to rotate and to wobble. When acted on by pressure forces from the water through which the lure is moving, the second curved plane experiences a particular set of forces that create and maintain the desired complex motion of lure 17. Specifically, the design enables lure 17 to rotate, oscillate, and irregularly wobble. If tail portion 8 is formed of resilient material, the pressure forces of the water cause tail portion 8 to flex, which simulates the appearance of elongated swimming aquatic animals with head wobbling, body undulation, and tail flexure all in natural relation to one another.

Referring to FIGS. 2 and 3, adjustment of angles and dimensions will create differences in dynamic performance when the fishing lure is pulled through water. Particularly adjustment of angles $\alpha$, $\beta$, and $\theta$, and dimensions of first body portion 4, second body portion 5 and third body portion 6 will create the most significant changes in dynamic performance when the fishing lure is pulled through water.

When the lure is pulled through water reaction forces on body portion 7 in the second said plane that are near the primary longitudinal axis of the direction of travel create transverse-direction forces that cause the lure to wobble to one side. As body portions 4, 5, and 6 are forced away from the primary longitudinal axis of the direction of travel, reaction forces from the water increase in a direction back toward the primary longitudinal axis of the direction of travel, thereby creating a side-to-side wobbling motion.

When the lure is pulled through water, reaction forces on body portion 7 in the second said plane, that are far from the primary longitudinal axis of the direction of travel, create rotational forces that cause the lure to rotate.

Figure 5:
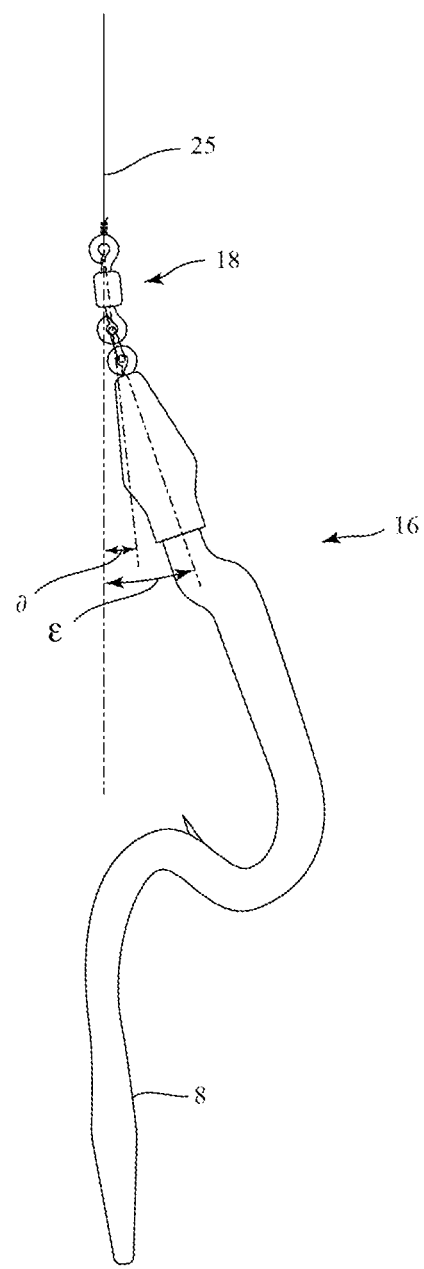
FIG. 5 is a top view of the fishing lure assembly of FIG. 1 showing a position when pulled through water.

Referring now to FIG. 5, fishing lure assembly 16 moves dynamically when the lure is being pulled through water by fishing line 25. When pulled through water swivel 18 assumes a swivel angle $\partial$ and fishing lure assembly 16 assumes a fishing lure assembly angle of. Swivel angle $\partial$ will vary depending upon the speed that fishing lure assembly 16 is pulled through water, thereby creating the appearance from certain viewing perspective angles of head wobbling. Fishing lure assembly angle will vary depending upon the speed that fishing lure assembly 16 is pulled through water. Tail portion 8 will flex due to forces applied to it that vary depending upon the speed that fishing lure assembly 16 is pulled through water thereby creating varying tail flexure.

Figure 6:
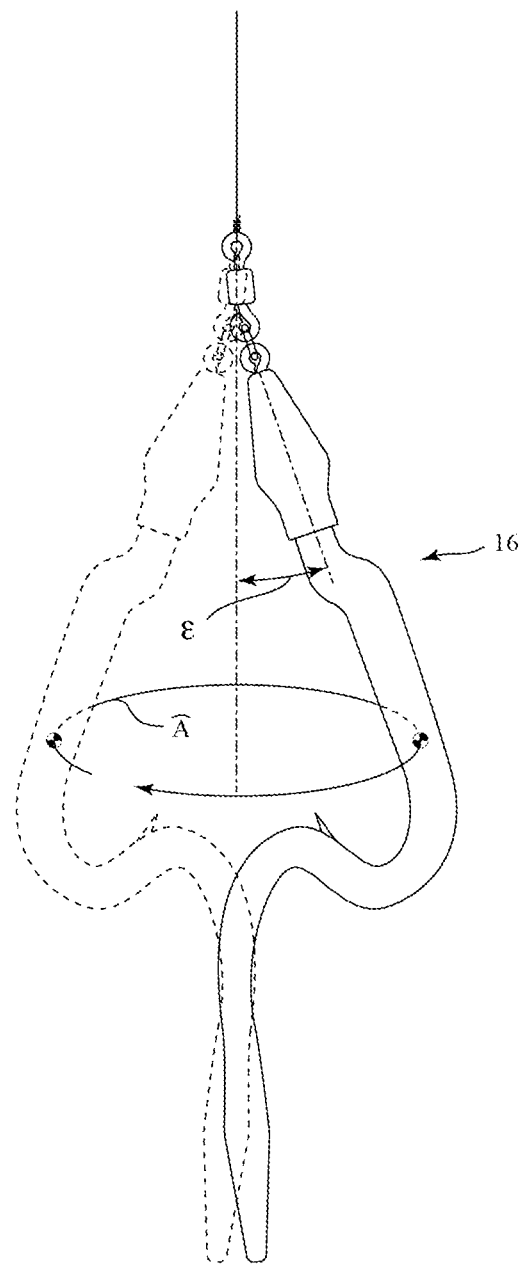
FIG. 6 is a top view of the fishing lure assembly of FIG. 1 showing motion when pulled through water.

Referring now to FIG. 6, fishing lure assembly 16 will rotate about an arc illustrated by arc A when pulled through water. Being oriented at fishing lure assembly angle and rotating through arc A creates the appearance from certain viewing perspective angles of large magnitude body undulation.

An embodiment may include swivel 18 to prevent fishing line from twisting and creating entanglements. The use of a swivel 18 also provides for increased freedom to pivot to enhance desired motions.

Figure 4:
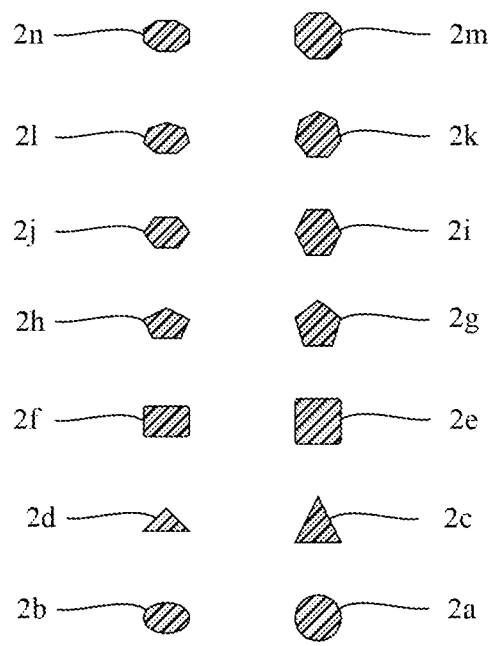
FIG. 4 is a sectional view of the head or body of the fishing lure of FIG. 1.

Referring back to FIG. 4, head 3 may be formed into a variety of cross-sections. More particularly head 3 may have any of the cross-sections 2$a$-2$n$, other sectional shapes, and/or sectional shapes that vary along the length of the head or body portions.

Referring now to FIGS. 1-2 and 7-8, hook member 9 includes head retention feature 11 at a proximal end and hook point portion 23 and hook gape portion 24 at the distal end. Head retention feature 11 serves to create a more secure connection between head 3 and hook member 9 by creating a mechanical interference between the material of the hook and the material of the head.

Figure 7:
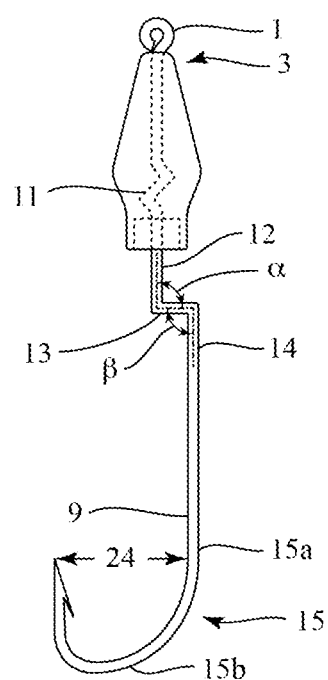
FIG. 7 is a top view of a hook and head of the invention.
Figure 8:
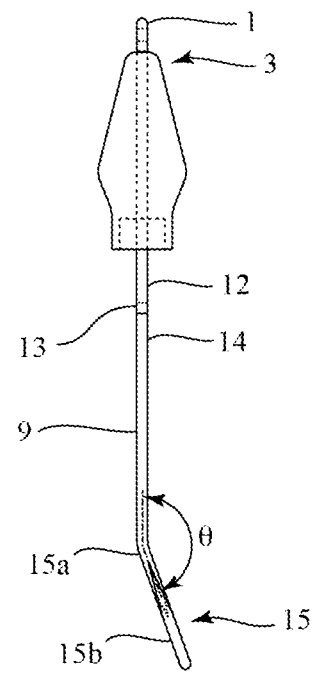
FIG. 8 is a side view of the hook and head of the invention.

Referring now to the invention shown in FIGS. 7-8, hook member 9 includes:
1. first hook portion 12, extending from cervical portion 3$b$ of the head 3 and disposed substantially along an extension of the primary longitudinal axis of head 3;
2. second hook portion 13 disposed at a first exterior angle $\alpha$ to first hook portion 12;
3. third hook portion 14 disposed at a second interior angle $\beta$ to second hook portion 13 such that head 3, first hook portion 12, second hook portion 13 and third hook portion 14 lie substantially within the same plane;
4. fourth hook portion 15 that contains curved portion 15$b$ curving in the direction toward head 3 and that is disposed substantially into a second plane forming an obtuse interior planar angle $\theta$ to the first plane; and
5. hook gape portion 24.

Use of the invention as embodied in FIGS. 5-6 allows the angler to make use of body 17 in order to customize the lure performance or to use live bait.

Figure 9:
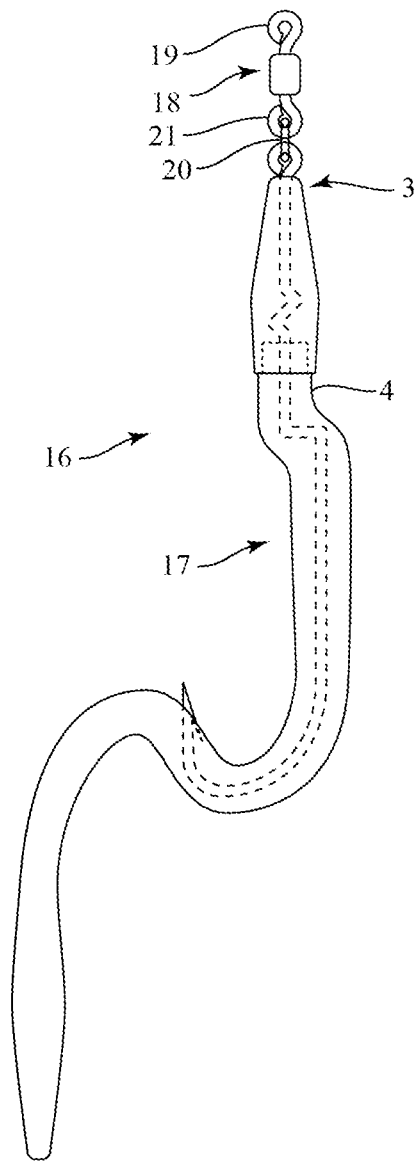
FIG. 9 is a top view of variations of the head and body of the invention.
Figure 10:
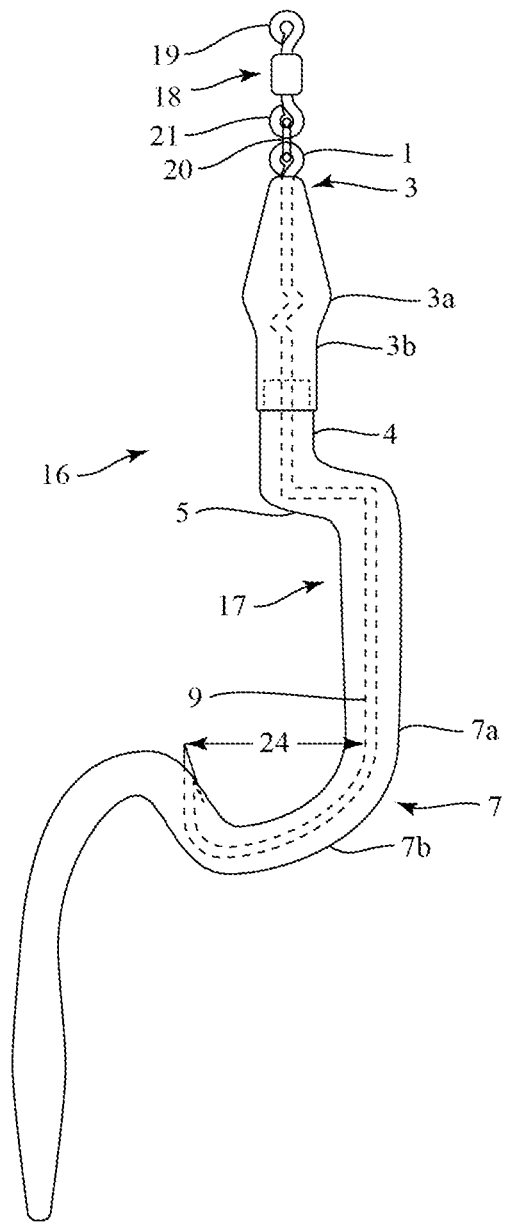
FIG. 10 is a top view of variations in cervical portions, body and hook gape portions of the invention.

Referring now to the embodiment shown in FIG. 9, head 3 may be formed with different shapes, for example a narrow shaped head 3 may be used, and the body 17 may be formed with different shapes, for example a wide shaped body 17 may be used as depicted in FIG. 10.

Referring now to the invention embodiment shown in FIG. 10, cervical portion 3$b$ of head 3 may be formed with different shapes, for example an elongated shape. Similarly, first body portion 4 may be formed with different shapes, for example an elongated shape. Also, hook member 9 may be formed with a wider aspect ratio creating a large gape portion 24.

Figure 11:
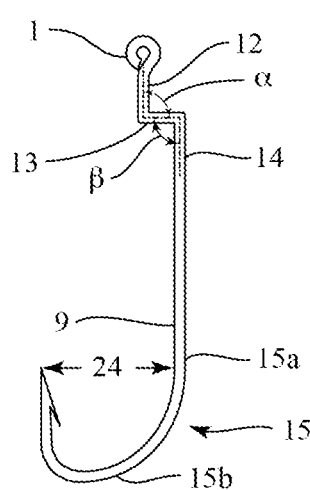
FIG. 11 is a top view of a hook of the invention.
Figure 12:
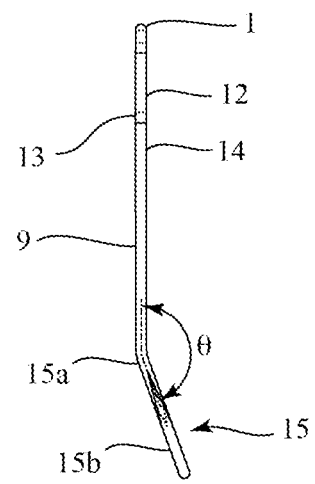
FIG. 12 is a side view of the hook of the invention.

Referring now to the embodiment shown in FIGS. 11-12, hook member 9 may be used without head 3. This embodiment further allows the angler to further customize the lure performance by using different types of bodies including bodies representing different sizes and shapes of worms, snakes, frogs, lizards, eels or fish.

Figure 13:
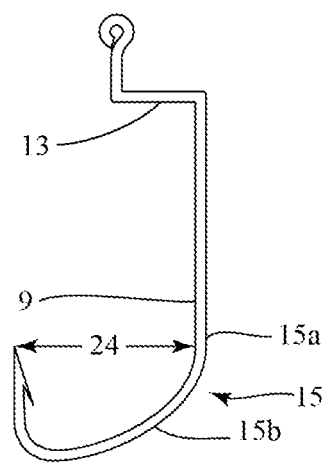
FIG. 13 is a top view of a variation of the hook gape and hook second portion of the invention.

Referring now to the embodiment shown in FIG. 13, hook member 9 may include hook gape portion 24 and hook second portion 13 of differing sizes and shapes depending upon the fish species targeted or other factors.

Figure 14:
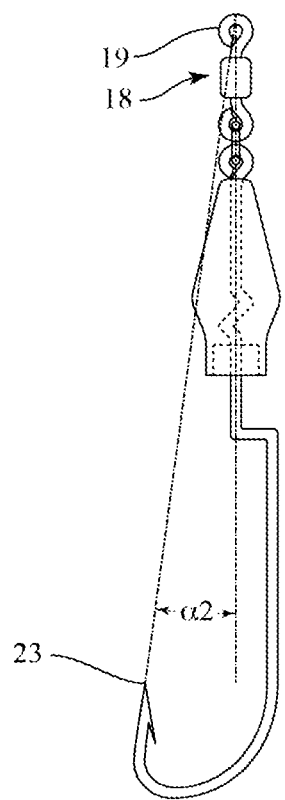
FIG. 14 is a top view of a variation of the hook gape and hook point direction of the invention.
Figure 15:
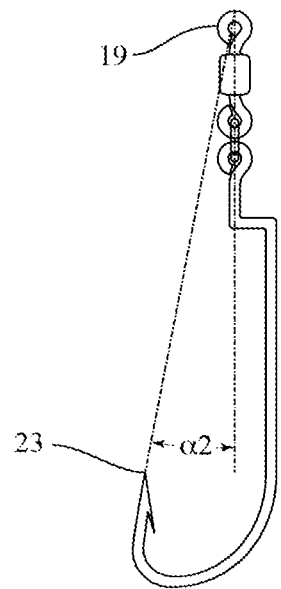
FIG. 15 is a top view of a variation of the hook gape and hook point direction of the invention.

Referring now to the embodiment shown in FIGS. 14-15, hook point 23 is aimed at an angle α2 toward attachment 19 so that forces applied to implant hook point 23 in the mouth of the fish are better aligned with the direction of pull of the fishing line attached to attachment 19.

Figure 16:
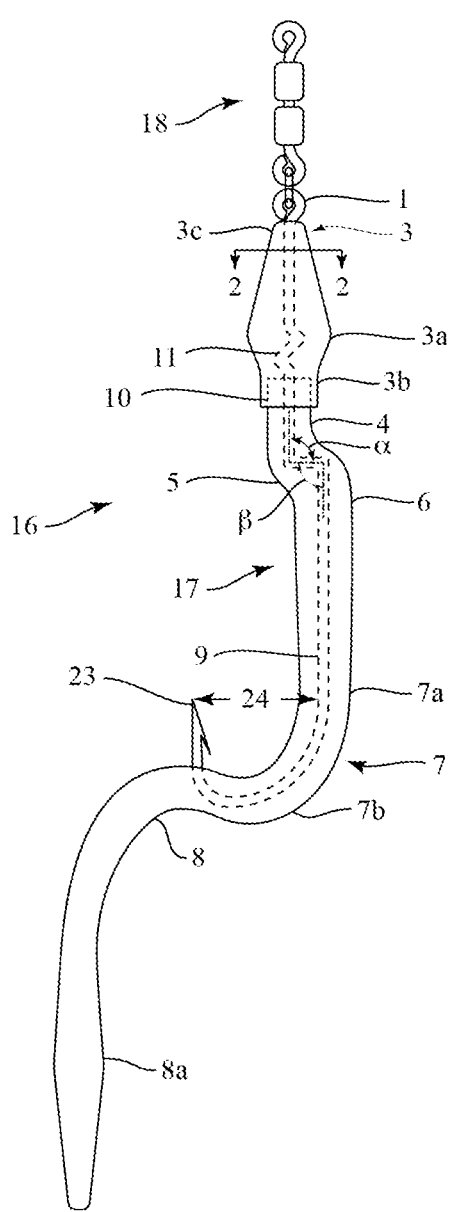
FIG. 16 is a top view of a variation of the body and tail shape and swivel mechanism of the invention.
Figure 17:
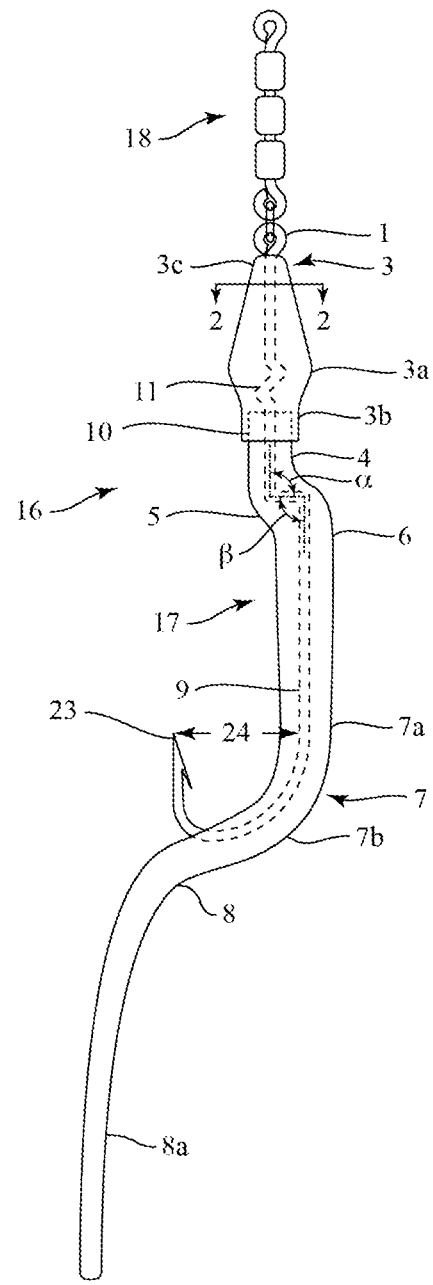
FIG. 17 is a top view of a variation of the body and tail shape and swivel mechanism of the invention.

Referring now to the invention shown in FIGS. 16-17, tail portion 8 and fourth body portion 7 may be formed into shapes having more or less curvature. Tail portion 8a may be formed into differing shapes, and swivel mechanism 18 may have multiple laterally and angularly movable and rotating sections.

In an embodiment, head 3 may be formed of a hard material while body 17 is formed of a resilient material. More particularly tail portion 8 may be formed of a resilient material to create flexure when pulled through water. For targeting common predatory fish species, such as largemouth bass, an embodiment may have an overall length, from the attachment 1 to the end of tail portion 8, of between four and eight inches; head 3 may have a length between 0.60 inches to 1.20 inches and a diameter between 0.30 inches and 0.60 inches; and hook member 9 may have a width, from hook shank portion 22 to hook point portion 23, of between 0.40 inches and 0.80 inches. In an embodiment the first exterior angle α is between 80 degrees and 110 degrees, the second interior angle β is between 80 and 110 degrees, and the obtuse interior angle θ is between 175 degrees and 150 degrees.

In the preferred embodiment, the fishing lure may be decorated with color or texture to further enhance the resemblance to the desired swimming aquatic animals. Attached features such as movable eyes may be included.

The advantages of the present invention include, without limitation, the characteristic when pulled through water of creating a unique set of motions that entail some variable mixes of rotation, regular oscillation, irregular wobbling, and flexure in order to maximize an appearance similar to elongated swimming aquatic animals such as sea or freshwater snakes, eels, lizards or elongated fish and appearing to have head wobbling, large amplitude body undulation, and tail flexure all in natural relation, including in timing, in magnitude and in direction, to one another.

Glossary of Claim Terms

Hook Gape: is a gap between the hook point and the hook shank.

Obtuse Angle: is an angle less than 180 degrees, but more than 90 degrees.

Plane: is a two-dimensional, infinitely-extending, surface.

Swivel Mechanism: is a device that includes a first attachment mechanism coupled to a second attachment mechanism in a manner that allows the first and second attachment mechanisms to freely rotate with respect to each other.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A fishing lure assembly, comprising:
    a proximal end and a distal end, the proximal end having an attachment mechanism formed integrally with a hook, the attachment mechanism configured to enable the fishing lure assembly to be in communication with a fishing line;
    the hook disposed between the proximal and distal ends of the fishing lure assembly and includes a hook gape extending between a hook point and a hook shank; and
    an elongated and generally cylindrical lure body disposed between the proximal end of the fishing lure assembly and the distal end of the fishing lure assembly, the lure body further including:
        a first body section, a second body section, a third body section, and a fourth body section;
        the first body section extending from the proximal end of the fishing lure towards the second body section in a longitudinal direction of the fishing lure;
        the second body section extending laterally, from the first body section at an exterior angle that is less than 180 degrees, towards the third body section;
        the third body section extending from the second body section at an interior angle that is less than 180 degrees, towards the fourth body section;
        the fourth body section having a curved shape extending from the third body section to the distal end of the fishing lure assembly, wherein a majority of the hook is disposed within the lure body having the hook point protruding from the fourth body section;
        the first body section, second body section, and third body section disposed in a first plane having a longitudinal axis and a lateral axis, such that the first plane is two-dimensional and wherein the longitudinal axis and the lateral axis are perpendicular to each other;
        the curved fourth body section disposed in a second plane having a longitudinal axis and a lateral axis, wherein the lateral axis are perpendicular to each other;
        the first plane and the second plane are oriented such that there is an obtuse planar angle between the longitudinal axis of the first plane and the longitudinal axis of the second plane, and the lateral axis of the first plane is parallel to the lateral axis of the second plane,
        the position of the fourth body section disposed in the second plane relative to the first plane causes the fishing lure assembly to rotate about a primary longitudinal axis when pulled through fluid; and
    a fishing lure assembly angle greater than or equal to one (1) degree and less than or equal to thirty (30) degrees formed by the intersection of a fishing line axis formed along an extent of the fishing line and a central longitudinal axis of the first body section, wherein the fishing lure assembly angle is formed when the fishing lure assembly is pulled through fluid.

2. The fishing lure assembly of claim 1, further comprising a flexible tail section extending between the fourth body section and the distal end.

3. The fishing lure assembly of claim 1, further comprising a head disposed between the body and the attachment mechanism.

4. The fishing lure assembly of claim 1, further comprising the hook shank extending from the attachment mechanism to the fourth body section, a curved hook section extending through the fourth body section and terminating at the hook point that extends from the fourth body section.

5. The fishing lure assembly of claim 1, wherein the second body section extends outward in a lateral direction that is opposite from a direction in which the fourth body section curves outwardly from the third body section.

6. The fishing lure assembly of claim 1, further comprising a majority of the hook disposed outside of the lure body with the hook point disposed within the fourth body section.

7. The fishing lure assembly of claim 1, wherein the first, second, and third body sections are linear, and the fourth body section has a curved portion.

8. The fishing lure assembly of claim 1, wherein the first, second, third, and fourth body sections are fixed in orientation with respect to each other, thereby ensuring that the first and second planes remain in their specific orientation when subjected to external forces as the fishing lure assembly is pulled through fluid.

9. The fishing lure assembly of claim 6, whereby the position of the fourth body section resides within the second plane relative to the first plane thereby causing the fishing lure assembly to rotate about a primary longitudinal axis when pulled through fluid.

10. A hook assembly, comprising:
a proximal end and a distal end, the proximal end having an attachment mechanism configured to enable the hook to be in communication with a fishing line and the distal end having a hook point;
wherein the attachment mechanism has a first end attached to the fishing line, and a second end opposite the first end attached to a fishing lure;
a hook shank including:
a first hook section, a second hook section, and a third hook section residing in a first plane having a longitudinal axis and a lateral axis, wherein the longitudinal axis and the lateral axis are perpendicular to each other;
the first hook section extending from the proximal end towards the second hook section in a longitudinal direction of the hook;
the second hook section extending laterally, from the first hook section at an exterior angle that is less than 180 degrees, towards the third hook section;
the third hook section extending from the second hook section, at an interior angle that is less than 180 degrees, towards the fourth hook section;
a fourth hook section having a curved shape extending from the third hook section to the distal end of the hook assembly, the fourth hook section residing in a second plane having a longitudinal axis and a lateral axis, wherein the longitudinal axis and the lateral axis are perpendicular to each other;
the orientation of the second plane with respect to the first plane thereby causing the hook assembly to rotate about the first axis when the majority of the fourth hook section is disposed within an elongated and generally cylindrical lure body and the hook assembly is pulled through fluid;
the first plane and the second plane are oriented such that there is an obtuse planar angle between the longitudinal axis of the first plane and the longitudinal axis of the second plane, and the lateral axis of the first- plane is parallel to the lateral axis of the second plane;
the first, second, third, and fourth hook sections are fixed in orientation with respect to each other, thereby ensuring that the first plane and second plane remain in their specific orientation when subjected to external forces as the hook is pulled through fluid; and
a fishing lure assembly angle greater than or equal to one(1) degree and less than or equal to thirty (30) degrees formed by the intersection of a fishing line axis formed along an extent of the fishing line and a central longitudinal axis of the first hook section, the fishing lure assembly angle formed when the hook assembly is pulled through fluid.

11. The hook assembly of claim 10, further comprising a head disposed distally with respect to the attachment mechanism, wherein the head has a circumference greater than the width of the first hook section.

12. The hook assembly of claim 10, wherein the second hook section extends outward in a lateral direction that is opposite from a direction in which the fourth hook section curves outwardly from the third hook section.

13. The hook assembly of claim 10, further comprising a flexible body enclosing the hook shank while the hook point remains exposed from the flexible body.

14. A fishing lure assembly, comprising:
an elongated and generally cylindrical lure body residing within a first plane and a second plane, having a proximal end and a distal end, the proximal end in communication with an attachment mechanism configured to enable the fishing lure assembly to be in communication with a fishing line;
wherein the attachment mechanism has a first end attached to the fishing line, and a second end opposite the first end attached to the fishing lure assembly;
a hook disposed between the proximal and distal ends of the fishing lure assembly, the hook including a hook point, a hook shank, and a hook gape extending between the hook point and the hook shank, wherein the hook shank resides within an outer lateral surface of the lure body;
the hook shank further including:
a first hook section, a second hook section, and a third hook section residing in the first plane having a longitudinal axis and a lateral axis, wherein the longitudinal axis and the lateral axis are perpendicular to each other;
the first hook section extending from the proximal end of the lure body towards the second hook section in a longitudinal direction of the fishing lure;
the second hook section extending laterally from the first hook section towards the third hook section at an exterior angle that is less than 180 degrees;
the third hook section extending from the second hook section towards a fourth hook section at an interior angle that is less than 180 degrees;
the fourth hook section having a curved shape extending from the third hook section to the hook point thereby establishing the hook gape, the fourth hook section residing in the second plane having a longitudinal axis and a lateral axis, wherein the longitudinal axis and the lateral axis are perpendicular to each other;
whereby when the fishing lure assembly is pulled through fluid, the extension of a second body section laterally from a first body section causes a wobble motion of the fishing lure assembly when pulled through fluid;
the first plane and the second plane are oriented such that there is an obtuse planar angle between the longitudinal axis of the first plane and the longitudinal axis of the second plane, and the lateral axis of the first plane is parallel to the lateral axis of the second plane;

the first, second, third, and fourth hook sections are fixed in orientation with respect to each other, thereby ensuring that the first plane and second plane remain in their specific orientation when subjected to external forces as the hook is pulled through fluid; and a fishing lure assembly angle greater than or equal to one (1) degree and less than or equal to thirty (30) degrees formed by the intersection of a fishing lure axis formed along an extent of the fishing line and a central longitudinal axis of the first hook section, the fishing lure assembly angle formed when the fishing lure assembly is pulled through fluid.

15. The fishing lure assembly of claim 14, further comprising a head disposed between the lure body and the attachment mechanism.

16. The fishing lure assembly of claim 14, wherein the second hook section extends outward in a lateral direction that is opposite from a direction in which the fourth hook section curves outwardly from the third hook section.

17. The fishing lure assembly of claim 14, wherein the first, second, third, and fourth hook sections are fixed in orientation with respect to each other, thereby ensuring that the first plane and second plane remain in their specific orientation when subjected to external forces as the hook is pulled through fluid.

* * * * *